Jan. 12, 1965
R. G. WHITNAH
3,165,746
MONOPULSE RECEIVER
Filed Sept. 19, 1962
5 Sheets-Sheet 1
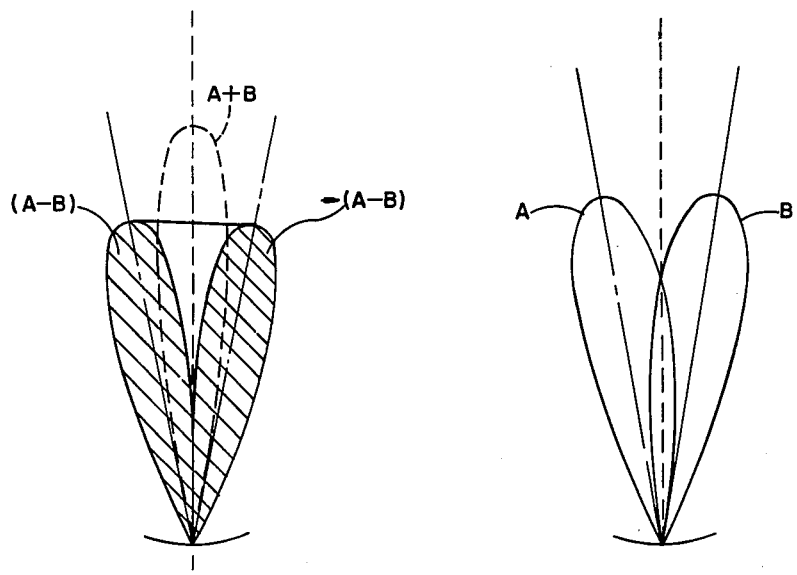
FIG. 2
FIG. 1A
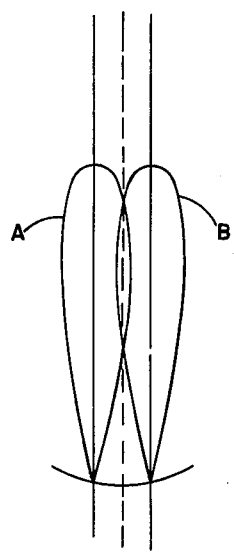
FIG. 1B
*INVENTOR.*
RICHARD G. WHITNAH
BY
ATTORNEY

United States Patent Office 3,165,746
Patented Jan. 12, 1965

3,165,746
MONOPULSE RECEIVER
Richard G. Whitnah, Garden Grove, Calif., assignor to
North American Aviation, Inc.
Filed Sept. 19, 1962, Ser. No. 224,615
14 Claims. (Cl. 343—113)

This invention relates to an improved monopulse receiver, and more particularly to means for improving the effective range of target angles that may be detected by a monopulse target angle detector employing antenna means having the usual apertures.

In monopulse systems for measuring the target angle or angle-off-boresight of a detected target (situated within the antenna beam width) in a given plane containing the antenna boresight axis or radiation axis of symmetry, conventional sum-and-difference monopulse receivers employ the sum of and the difference between two received signals to provide a target angle signal indicative of the ratio of the difference signal to the sum signal. In a practical mechanization, as is described for example in U.S. Patent No. 2,948,892 for a Precision Indicating System, issued August 9, 1960, to W. D. White, such ratio is achieved by employing automatic gain control means responsively connected to the sum signal channel output for normalizing both the sum and difference signals. In this way, the output signal level of the sum channel remains constant regardless of the input level of the sum signal. In other words, the gain of the sum signal channel tends to vary inversely as the level of the sum signal. Similarly, the gain of the difference channel is made to vary inversely as the signal level of the sum signal, whereby the output of the difference channel represents the ratio of the difference signal to the sum signal. The difference channel output signal (which is by the previous operation is turned into a ratio of difference signal to sum signal) may then be phase-detected relative to the sum signal to provide a signal having a sense, as well as an amplitude, which is indicative of the angle-off-boresight of a detected target.

However, the range of boresight angles for which useful target angle signals can be thus provided is limited. The reason for such limitation is inherent in the higher system gain provided by the automatic gain control means for the larger angles-off-boresight. For the larger angles-off-boresight, the sum signal associated with the resulting difference signal is so attenuated, or weak, that the automatic gain means responds so as to greatly increase the system gain, thereby increasing noise level in the system. Such increased system gain also increases the signal levels returned from the side lobes of the antenna radiation pattern, whereby false tracking signals may be generated within the system. Such sensitivity of the system to sidelobe information, referred to in the art as target angle anomaly, may be attenuated in practice by means of signal shaping, or limiting, of the target angle signal, whereby the effective range of useful target angle information is restricted to target angles less than those angles for which such side lobe signals are associated. In other words, target angles greater than a certain maximum cannot be determined and will appear as the maximum angle.

Such restricted range of effective target angle signal decreases the effective beamwidth of the antenna, and requires increased reliance on mechanical scanning means for scanning larger search areas. Such increased reliance on mechanical scanning of an area under surveillance decreases the rate at which information is obtained regarding targets in that area.

The concept of the subject invention provides an increased range of target angle data having improved linearity over an increased range of target angles for a given monopulse antenna, thereby increasing the effectiveness of such antenna. Such result is particularly significant to air traffic surveillance systems wherein maximum information rates and increased accuracy are critical to high speed traffic control of aircraft.

The concept of the subject invention also provides an improved signal-to-noise ratio, whereby improved signal resolution is obtained.

In a preferred embodiment of the subject invention there is provided a monopulse angle detection receiver having antenna elements (such as two or more apertures, displaced say, vertically or horizontally from each other) for receiving signals from a target. There is further provided means for increasing the effectiveness of the antenna, comprising means responsive to the received signals for providing an automatic gain control signal which is a function of that one of the received signals having the larger amplitude.

By means of the above described arrangement, a target angle signal is provided, the gain of which is controlled by, or "normalized to" the stronger one of the received target signals. It is, therefore, a general object of the invention to improve the effectiveness of a radar and its antenna.

Accordingly, it is also an object of the subject invention to provide means for improving the effective beamwidth for a monopulse receiving antenna.

It is another object of the subject invention to provide means for increasing the range of angles-off-boresight for which a monopulse target angle signal may be generated.

It is still another object of the subject invention to provide means for improving the signal-to-noise ratio of target angle signals generated in a monopulse receiver.

It is yet another object of the subject invention to provide means for improving the monopulse receiver sensitivity to target angles-off-boresight.

It is a further object of the subject invention to provide means for improving the linearity of target angle signals in a monopulse receiver.

These and other objects of the invention will become apparent from the following description, taken together with the accompanying drawings, in which:

FIGS. 1(A) and 1(B) are illustrations of an antenna radiation pattern of a microwave antenna having two antenna elements, such as, for example, two microwave apertures, or horns.

FIG. 2 is an illustration of a representative sum-and-difference antenna radiation pattern for the antenna having the radiation pattern shown in FIG. 1(A).

In the figures, like reference characters refer to like parts.

Referring to FIG. 1(A) there is illustrated the antenna radiation patterns resulting from a pair of angle squinted radiating apertures or antennas (e.g., antenna elements having a common phase center and directed to radiate at an angle with respect to each other). In FIG. 1(B) is shown a pair of spaced radiating apertures or antennas (e.g., antenna elements whose phase centers are displaced from each other but having their boresight axes parallel to each other.) Only the left and right main lobes, designated A and B respectively, are shown, side lobes being omitted for ease of representation. Understanding that an antenna's radiation pattern is also representative of its reception pattern, the return signals received by two antenna elements in accordance with their respective lobes, A and B, may be denoted A and B, respectively.

Figure 3:
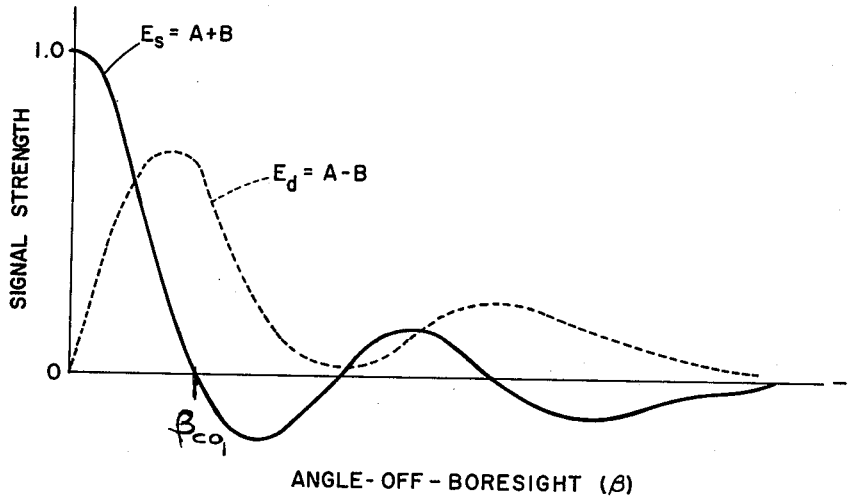
FIG. 3 is a diagram of variation in signal strength of the sum-and-difference signals of FIG. 2, plotted as a function of angle-off-boresight $\beta$.

In the conventional sum-and-difference monopulse receiver (for a given reference plane of a dual plane angle detection system), an additional pair of data signals are formed from a set of A and B antenna signals. These are the sum signal $E_s$ and difference signal $E_d$, corresponding to the terms, $(A+B)$ and $(A-B)$ respectively. The variation of these signals as a function of angle-off-boresight is illustrated in FIG. 2. The sum-and-difference patterns may be generated from signals obtained from either the squinted apertures of FIG. 1(A) or the spaced apertures of FIG. 1(B). The negative sign shown in designating one of the $(A-B)$ or difference lobes in FIG. 2, serves only to indicate the change in sense or phase reversal of the difference signal $E_d$, corresponding to a change in the sense of the associated angle-off-boresight. Such sum ($E_s$) and difference ($E_d$) signals are also shown in FIG. 3, plotted as a function of angle-off-boresight ($\beta$). The cross-overs of the sum signal ($E_s$) relative to the origin, and the points of inflection of the difference signal ($E_d$) illustrate undesirable side-lobe effects, which side lobes are omitted from FIGS. 1(A) and 1(B) and 2.

In the prior art, the target angle or angle-off-boresight ($\beta$) of a detected target in a given reference plane (for a given antenna array represented by the A and the B antenna signals), was approximated by the signal ratio, $$\frac{E_d}{E_s} = \frac{A-B}{A+B}$$

of the signals shown in FIG. 3.

It is easily seen from FIG. 3, that as the function $E_s$ versus $\beta$ approaches its first null or cross-over point, the function $E_d/E_s$ will "blow-up" or become non-linear, as a function of $\beta$. In other words, the signal ratio $E_d/E_s$ does not vary proportionately with variation in $\beta$ for larger values of $\beta$. Further, even at target angles less than the initial or smaller target angle ($\beta_{co_1}$), for which $E_s$ is a null the relationship of the $E_d$ and $E_s$ signals as a function of $\beta$ are such that the ratio $E_d/E_s$ is not a linear function of $\beta$ except for small excursions of $\beta$ about zero. Such characteristic is shown more clearly for a limited range of target angles ($\beta$) in FIG. 4.

Figure 4:
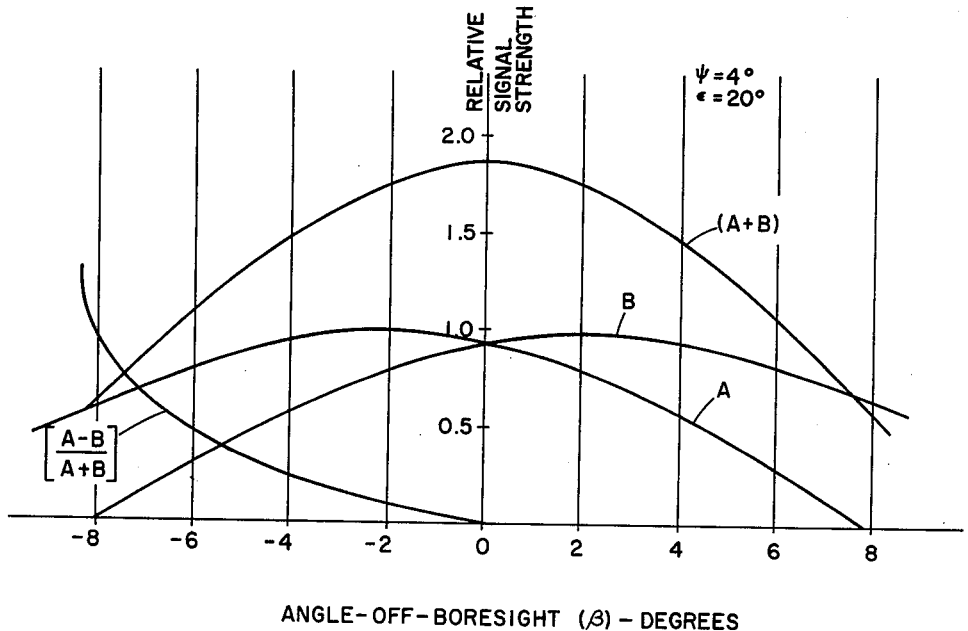
FIG. 4 shows the variation in various signals and combinations thereof as functions of angle-off-boresight for an exemplary antennna.
Figure 5:
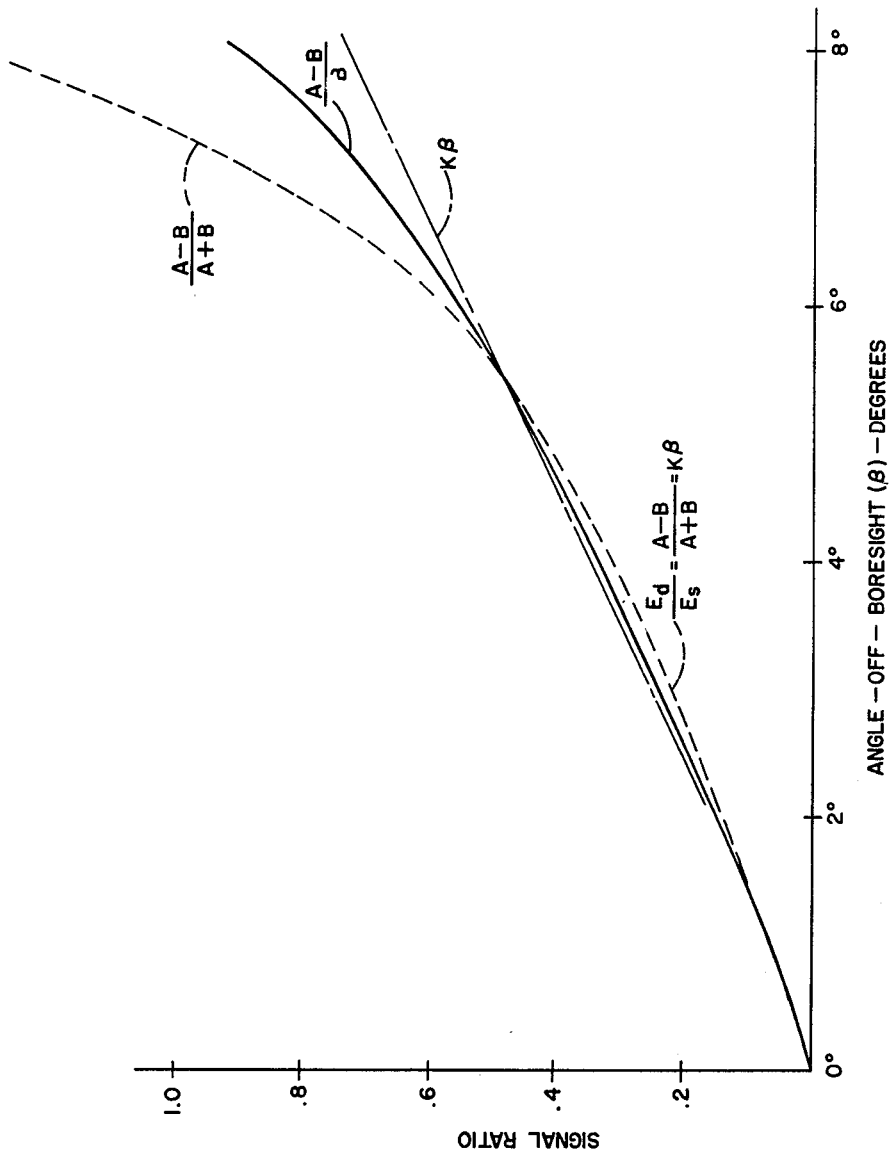
FIG. 5 is an illustration comparing the conventional angle-off-boresight ratio signal and improved ratio signal, showing the improved linearity of the latter as a function of angle-off-boresight.

Referring to FIG. 4, there is illustrated the variation in A, B, $(A+B)$, $(A-B)$ and $$\left(\frac{A-B}{A+B}\right)$$

for a sum-and-difference monopulse receiver, plotted as a function of ange-off-boresight $\beta$. The curves shown illustrate the signals provided by the antenna of FIG. 1(A), with, say, an 11° beamwidth and having the boresight axes of the apertures at an angle $\psi$ (squint angle) between apertures of 4° and an angle $\epsilon$ between the first nulls of the main lobe of 20°. Curves A and B in FIG. 4 represent the respective main lobes of the antenna patterns provided by two apertures to the left and right respectively of the antenna boresight axis. Curve $(A+B)$ represents the sum signal obtained in the sum channel of a sum-and-difference monopulse receiver. Curve $$\left(\frac{A-B}{A+B}\right)$$

represents the conventional boresight angle ($\beta$) determined as the ratio of a difference signal $(A-B)$ to the sum signal $(A+B)$, and indicates the increasingly non-linearity of the ratio signal to the boresight angle $\beta$ for increasing values of $\beta$. While the term $$\left(\frac{A-B}{A+B}\right)$$

has been drawn as a function of boresight angles of only one sense (e.g., negative values of $\beta$), it is to be understood that such term as a function of the opposite sense of ($\beta$) (e.g., positive values of $\beta$), would be the mirror image of the curve shown in FIG. 5 and of opposite sense.

A target angle signal which is more linearly related to $\beta$, than is the ratio of the difference and sum signals, is shown in FIG. 5.

Referring to FIG. 5, there is illustrated several signal functions plotted versus angle-off-boresight of a given sense and for the same antenna employed for FIG. 4. Curve K$\beta$ represents an ideally linear response K$\beta$ versus $\beta$, where K is the scale factor determined by the characteristics of a given system. Curve $E_d/E_s$ is determined by the calculation $$\frac{A-B}{A+B}$$

mechanized by a conventional sum-and-difference monopulse system, and demonstrates the extreme non-linearity of such function for larger values of $\beta$. Curve $$\frac{A-B}{B}$$

represents the function $$\frac{A-B}{B} \text{ versus } \beta$$

and demonstrates the improved linearity of such function relative to the function $E_s/E_d$, for low as well as high values of $\beta$.

The reason for such improved linearity is due to the fact that for angles-off-boresight having a sense corresponding to the sense of the lobe B axis relative to the antenna boresight axis, the gain of the B lobe pattern in FIG. 4, for example, is not attenuated as rapidly as the sum signal $(A+B)$ is attenuated, as the angle-off-boresight increases, but instead slightly increases up to a boresight angle corresponding to a maximum gain point (at the axis of symmetry of the lobe), and then decreases slightly as the angle-off-boresight is increased. At boresight angles above such region, of course (at 6° to 8° in FIG. 5), the function $$\frac{A-B}{B}$$

become non-linear, but not to the same extent as the function $$\frac{A-B}{A+B}$$

(in the same region). FIG. 5 shows the function $$\frac{A-B}{B}$$

for determining angle-off-boresight axis $\beta$, determined from the signal returned from the B lobe. The angle-off-boresight may also be determined from $$\frac{A-B}{A}$$

when the signals returning from the A lobe are stronger. Hence, it is to be appreciated that the ratio of the difference between the two antenna aperture signals to the stronger one of the signals returning from either the A lobe or the B lobe provides an improved signal more correctly indicative of the target angle $\beta$ of a detected target.

Figure 6:
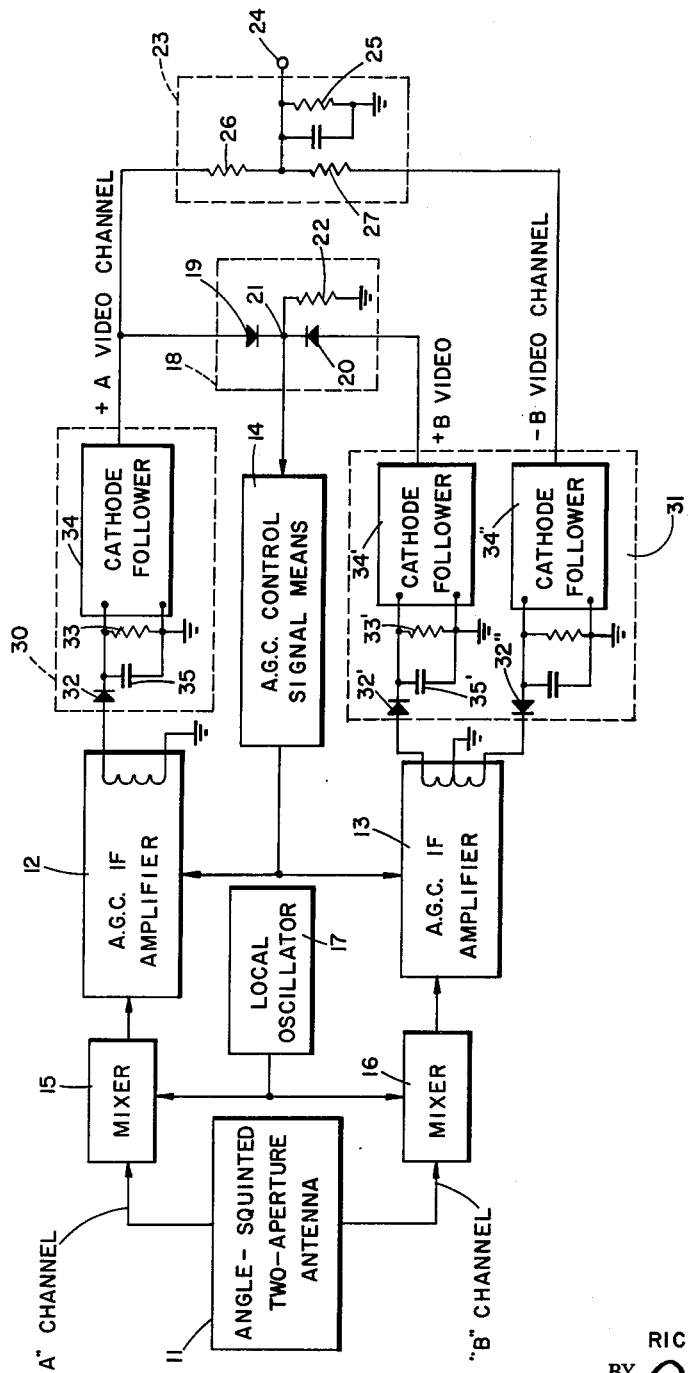
FIG. 6 is a block diagram of a monopulse receiver system employing a concept of the invention.

A monopulse system embodying such a concept is shown in FIG. 6.

Referring to FIG. 6, there is illustrated a preferred embodiment of the concept of the invention. In the specific embodiment illustrated, there is provided a monopulse receiver comprising an antenna 11 having, for example, two apertures having a main lobe pattern similar to that shown in FIG. 1(A), the apertures providing a first and second microwave output signal. There is further provided first and second automatic gain control amplifiers 12 and 13 operatively connected to the first and second output respectively of receiver antenna 11, and responsively connected to a common source 14 of an automatic gain control signal.

Interposed between microwave antenna 11 and a respective one of amplifiers 12 and 13 is a signal mixer 15 and 16 responsively connected to a local oscillator 17 for reducing the microwave antenna outputs to IF frequencies, as is usual in the art. In this way, usual IF amplifier techniques can be applied in processing the received signals from antenna 11.

The construction and arrangement of elements 11, 12, 13, 14, 15, 16 and 17 are well-known to those skilled in the art. Accordingly, elements 11, 12, 13, 14, 15, 16 and 17 are shown in block form only.

The IF outputs from amplifiers 12 and 13 are fed to video detectors 30 and 31 respectively.

The "A" channel video detector 30 may be comprised, for example, of a detector diode 32 in series with the input to a load impedance 33, which is connected across the input to a cathode follower 34. The polarity connection of the diode 32, as shown in FIG. 6, has been selected to provide an "A" channel video output signal of positive potential relative to a common ground point. The purpose of the cathode follower is only to provide impedance isolation. If desired, a capacitor 35 may be connected in circuit across load impedance 33 for filtering or smoothing the detected signal.

The "B" channel video detector 31 is comprised of two separate video detector units for providing a first and second "B" channel video output of positive and negative sense, respectively, relative to the common ground point. Both video units of detector 31 are similar in construction and arrangement to "A" channel detector 30; however, the detector diode 32″ of the negative "B" video channel is oppositely poled relative to both diode 32 of the "A" video channel and diode 32′ of the positive "B" video channel, in order to provide the desired negative sense for the second "B" channel video output.

There is further provided logic means (or, voltage comparison means) 18 responsively connected to the outputs of video detectors 30 and 31 for providing an automatic gain control signal as a function of that one of the video detectors outputs having the larger amplitude. In other words, logic means 18 is responsive to the outputs of detectors 30 and 31 for providing a common AGC or gain control signal determined from the larger amplitude one of such outputs. AGC signal means 14 couples the control signal to AGC amplifiers 12 and 13 (and may also provide signal shaping as desired) by means well-known in the art.

Logic means 18 may be comprised of a first and second diode 19 and 20 having a first like electrode connected back-to-back and commonly connected to an AGC terminal 21. The other electrode of each of diodes 19 and 20 is connected to a respective video detector 30 or 31, the polarity of the diode connections being selected to conductively connect the output of an associated video detector to junction 21. For example, the second electrode of diode 19 is conductively connected to an output of detector 30 having a given sense or phase polarity, and the second electrode of diode 20 is conductively connected to an output of detector 31 having a like sense or phase polarity. An impedance 22 is connected across the terminal 21 and the signal ground of amplifiers 12 and 13. To the extent, however, that AGC signal means 14 otherwise provides such an impedance, such specific low impedance may be omitted from the structure of logic means 18.

There is further provided differential signal means 23 having an output terminal 24 responsive to the outputs of detectors 30 and 31 for providing a signal indicative of the difference therebetween. Where the two amplifier outputs are of mutually opposed sense or polarity, a summing network may be employed to generate a signal indicative of the amplitude and sense of the difference between the two outputs. Accordingly, differential signal means 23 may be comprised of an output impedance 25 connected to output terminal 24 and to ground, and a first and second summing resistor 26 and 27.

In normal operation of the device of FIG. 6, a first and second positive video output signal appear as inputs to diodes 19 and 20 respectively. These two inputs correspond to the A and B signals received by antenna 11 in response to a detected radar target. Diodes 19 and 20 tend to permit signals of a given sense (say, of a positive sense) to be transmitted to AGC terminal 21. Because the applied inputs (or the positive portions of the wave shapes thereof) to diodes 19 and 20 are in phase, the positive input signal to one of diodes 19 and 20 tends to back-bias the other of diodes 19 and 20. For example, consider a +10 volt video "A" signal were applied to diode 19 from detector 30, and a +8 volt video "B" signal were applied to diode 20 from detector 31 (corresponding to a target lying to the left of the boresight axis of the antenna pattern in FIG. 1A). Ignoring the negligible voltage drop across diode 19, the +10 volt signal would appear essentially unattenuated at terminal 21. The difference between the +10 volts at terminal 21 and the applied +8 volts at the input to diode 20 would constitute a back-bias which would prevent the conduction of a "B" signal current through diode 20 and load impedance 22. Accordingly, the voltage at terminal 21 due to the IR drop across impedance 22 would be due solely to the +10 volt signal applied to diode 19. If the larger of the two input voltages of like sense were applied to diode 20, then diode 20 would conduct to the exclusion of diode 19, thereby being solely determinative of the voltage drop across load impedance 22.

Hence, it is to be appreciated that the components of logic means 18 cooperate to provide an AGC control signal which is indicative of the larger of two applied signals. AGC signal means 14 applies the control signal on terminal 21 to AGC amplifiers 12 and 13 to control the gains thereof as an inverse function of such control signal, as is well understood in the art. Accordingly, the output of each of amplifiers 12 and 13 is indicative of the ratio of the input signal from a corresponding mixer to the control signal.

Considering further the operational example described above, if the control signal is indicative of the larger A channel output from AGC amplifier 12, then the output of amplifier 12 will be reduced to a constant level, corresponding to the ratio $$\frac{A}{A} = 1$$

regardless of the amplitude of the A channel signal. Similarly, the output of amplifier 13 will provide a signal indicative of the B channel signal amplitude and having a gain inversely proportional to the A channel signal (which, in the above example, provides the AGC control signal). Therefore, the output from AGC amplifier 13 is indicative of the ratio $B/A$.

In applying the outputs of video detectors 30 and 31 in mutual phase opposition to summing means 23, a signal is provided which is indicative of the amplitude difference between such outputs, and having a sense indicative of the larger A channel output:

$$\frac{A}{A} - \frac{B}{A} = \frac{A-B}{A} \qquad (1)$$

Where the B channel output is the larger of the two outputs, then the B channel signal amplitude would be substituted for that of the A channel in the denominator of Equation 1.

Hence, the summation of the normalized or gain-controlled signals from amplifiers 12 and 13 provides the desired output signal on terminal 24:

$$\frac{A-B}{A} \text{ or else } \frac{A-B}{B}$$

Because the device of FIG. 6 does not employ phase detectors in the generation of the target angle signal, its performance is not subject to the phase-tracking errors (errors due to phase shift between associated channels) of the conventional sum-and-difference monopulse receiver systems.

While the illustrated embodiment of FIG. 6 is adapted to monopulse receiver antennas of the squint-angle aperture type (e.g., wherein the axis of the lobes of the apertures are at an angle with respect to each other), it may not be used with spaced or phase-squinted aperture type antennas (e.g., apertures whose phase centers are displaced with respect to each other and having lobes with parallel axes) without further adaptation. Further, although the device of FIG. 6 is not subject to phase-tracking errors, it is yet subject to errors or shifts in the indicated $\beta$ null due to gain tracking errors (e.g., relative differences in gain between the two signal channels).

Figure 7:
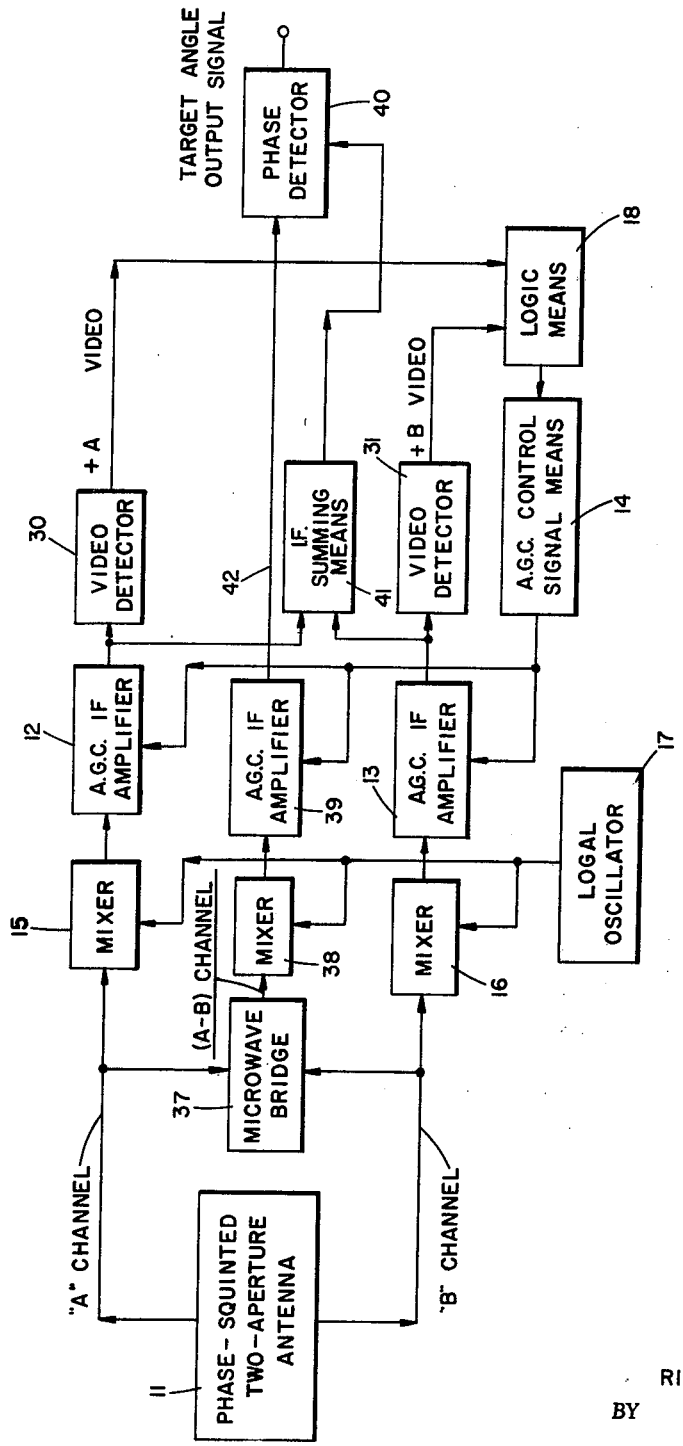
FIG. 7 is a block diagram of an alternate embodiment of the concept of the invention.

Means for adapting the concept of the invention to phase displaced aperture type antennas, and for avoiding both gain and phase tracking errors is shown in FIG. 7.

Referring to FIG. 7, there is illustrated an alternate embodiment of the invention. There is provided a two aperture antenna 11' having apertures whose phase centers are displaced from each other and whose main lobe pattern is similar to that shown in FIG. 1(B), for providing a first and second microwave output signal. There is further provided a microwave bridge 37 operatively connected to antenna 11' for providing a third microwave signal indicative of the difference between the two received microwave signals. Bridge 37 may be of a conventional type usually employed in sum-and-difference monopulse radar systems for providing a difference or error signal, as described for example in U.S. Patent 2,933,980, issued April, 1960, to J. R. Moore et al. for an Integrated Fire Control Autopilot. Accordingly, bridge 37 is shown in block form only.

Elements 12, 13, 14, 15, 16, 17 and 18 are also included, being constructed and arranged to cooperate substantially the same as like referenced elements of FIG. 6.

Additionally, there is provided a mixer 38 and AGC amplifier 39, constructed and arranged to cooperate substantially the same as mixer 15 and amplifier 12, the input of mixer 38 being responsively connected to microwave bridge 37, and the control input of amplifier 39 being responsively connected to AGC control signal means 14.

The IF output of amplifier 39 is fed to a phase detector 40, which provides a video output signal having a sense indicative of the sense of the difference between the first and second microwave received signals from antenna 11'. Such sense or polarity characteristic is provided by employing a reference signal from an IF summing means 41, which is responsively connected to the IF amplifiers 12 and 13.

In normal operation of the above described device, the IF amplifier 39, associated with the monopulse difference signal from mixer 38, adjusts the gain of the IF difference signal on line 42 inversely with the amplitude of the control signal from control signal means 14. Hence, the output from amplifier 39 is indicative of the ratio of the difference signal to the control signal. However, the operation of logic means 18 provides a control signal which is indicative of the larger amplitude one of the two antenna signals as explained in connection with FIG. 6. Accordingly, the signal on line 42 is indicative of the amplitude ratio of the difference between the two received signals to the larger of them.

Hence, it is seen that the embodiment of FIG. 7 resembles a conventional sum-and-difference monopulse receiver, in that the difference channel IF signal is phase-detected relative to a sum channel signal to obtain a video signal having a sense indicative of the sense of the angle-off-boresight of a detected target. The embodiment of FIG. 7 differs from such conventional sum-and-difference monopulse receiver, however, in that the normalization of the IF difference signal is a function of the larger amplitude one of the two microwave antenna signals, rather than function of a sum signal.

Hence, it is to be appreciated that the subject invention provides means for increasing the useful beamwidth of a monopulse radar system by increasing the effective range of angles-off-boresight for which a useful monopulse target angle signal may be generated.

Although the invention has been described and illustrated in detail, it is to be clearly understood that the same is by way of illustration and example only and is not to be taken by way of limitation, the spirit and scope of this invention benig limited only by the terms of the appended claims.

I claim:

1. In a radiant energy receiver, first and second antenna elements providing different relative response to received energy depending on the angle from which said energy arrives, means responsive to the output signals from said antenna elements for providing a signal indicating the difference of said antenna signals divided by the larger of said antenna signals.

2. The combination recited in claim 1 wherein the relative response of said antenna elements is in the amplitude of the signals provided by said antenna elements, and said means provides a signal indicating the difference of the amplitude of said antenna signals divided by the one of said antenna signals having the larger amplitude.

3. The combination recited in claim 1 wherein the relative response of said antenna elements is in the phase of the signals provided by said antenna elements and said means provides a signal indicating the difference of the phase of said antenna signals divided by the one of said antenna signals having the larger phase displacement.

4. In a monopulse receiver providing two received signals, difference means for providing a signal indicative of the difference between said two received signals, and means for providing a signal indicative of the amplitude ratio of the difference between said received signals to the larger of them.

5. In a monopulse receiver having an antenna wherein at least two antenna elements provide output signals, means for increasing the effective aperture of said antenna comprising: means responsive to the output signals of said antenna for selecting that one of said received signals having the larger amplitude, means responsive to said received signals for providing a difference signal indicative of the difference between said received signals, and means responsive to said selected signal and said difference signal for providing an output signal indicative of the ratio of said difference to said selected signal.

6. The device of claim 5 in which said latter-mentioned means is comprised of gain control means responsive to said selected signal for controlling the gain of said difference signal.

7. The device in claim 5 in which said latter-mentioned means is comprised of first and second automatic gain control means responsive to said selected signal for amplifying said first and second received signals respectively, and means combining said amplified first and second signals for providing a signal indicative of the difference therebetween.

8. In a target angle detection monopulse receiver having an antenna comprising separate apertures for providing two received signals, means for increasing the effective aperture of said antenna comprising: first and second automatic gain control means for amplifying a mutually exclusive one of said two received signals of said antenna; and logic means responsive to the outputs of said gain control means for providing a gain control signal as a function of the larger amplitude one of said outputs of said gain control means; said automatic gain control means being responsive to said gain control signal and differential signal means responsive to the outputs of said automatic gain control means for providing a target angle signal indicative of the difference therebetween.

9. In a target angle detection monopulse receiver system having an antenna having several apertures for providing two received signals, means for increasing the effective aperture of the antenna comprising: first, second and third automatic gain control means for amplifying respective ones of a first received signal, a second received signal, and the difference between said received signals; logic means responsive to said amplified first and second received signals for providing an automatic gain control signal as a function of that one of the two received signals having the larger amplitude, said gain control means being responsive to said gain control signal; and signal computing means responsive to said gain control means for providing a signal indicative of the target angle of a detected target.

10. The device of claim 9 in which said signal computing means comprises: signal summing means responsively connected to said first and second gain control means for providing a signal indicative of the sum of the outputs thereof, and a phase detector responsively connected to said third automatic gain control means and said signal summing means for generating said target angle signal.

11. In a monopulse receiver having an antenna comprising several apertures for providing a first and second received microwave signal, the combination comprising: a first and second automatic gain control means for amplifying said first and second received signal respectively; first video detection means responsively connected to said first automatic gain control means for providing a first video output of a first sense; second video detection means responsively connected to said second automatic gain control means for providing a second video output of like sense at said first video output and further providing a third video output having a sense opposite that of said first and second video outputs; logic means responsive to said first and second video signals for providing a gain control signal indicative of the larger amplitude one of said first and second video signals, said automatic gain control means being responsive to said gain control signal, and signal summing means being responsive to said first and third video signals for providing an output signal indicative of the sum thereof.

12. The device of claim 11 in which said logic means includes: an output terminal for providing a gain control signal, a first diode interposed in series circuit between said first video detector and said output terminal of said logic means, and a second diode interposed in series circuit between said second video detector and said output terminal of said logic means, said diodes being connected back-to-back at said output terminal.

13. In a monopulse receiver having an antenna comprising several apertures for providing a first and second received microwave signal and a microwave bridge for providing a third microwave signal indicative of the difference between said first two signals, means for increasing the effective aperture of said antenna comprising: a first, second and third automatic gain control means for amplifying a mutually exclusive one of said first, second and third signals; logic means responsive to said amplified first and second signals for providing a gain control signal as a function of the larger amplitude one of said amplified first and second signals; summing means responsive to said amplified first and second signals for providing a phase reference signal, said automatic gain control means being responsive to said gain control signal; and a phase detector operatively connected to said summing means and said amplified difference signal for providing an output signal.

14. In a monopulse receiver having an antenna comprising several apertures for providing a first and second received microwave signal, means for increasing the effective aperture of said antenna comprising: a microwave bridge responsively connected to said antenna for providing a third microwave signal indicative of the difference between said first and second received signals; a first, second and third automatic gain control means for amplifying a mutually exclusive one of said first, second and third signals; logic means responsive to said amplified first and second signals for providing a gain control signal as a function of the larger amplitude one of said amplified first and second signals; summing means responsive to said amplified first and second signals for providing a phase reference signal, said automatic gain control means being responsive to said gain control signal; and a phase detector operatively connected to said summing means and said amplified difference signal for providing an output signal.

References Cited in the file of this patent
UNITED STATES PATENTS 2,948,892    White  ---------------- Aug. 9, 1960
3,047,862    Jolliffe  ---------------- July 21, 1962